US009811781B2

United States Patent
Ariyoshi et al.

(10) Patent No.: US 9,811,781 B2
(45) Date of Patent: Nov. 7, 2017

(54) TIME-SERIES DATA PREDICTION DEVICE OF OBSERVATION VALUE, TIME-SERIES DATA PREDICTION METHOD OF OBSERVATION VALUE, AND PROGRAM

(71) Applicant: HONDA MOTOR CO., LTD., Tokyo (JP)

(72) Inventors: Tokitomo Ariyoshi, Wako (JP); Takahiro Fukushige, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 446 days.

(21) Appl. No.: 14/499,358

(22) Filed: Sep. 29, 2014

(65) Prior Publication Data
US 2015/0112900 A1    Apr. 23, 2015

(30) Foreign Application Priority Data
Oct. 23, 2013    (JP) .................................. 2013-220641

(51) Int. Cl.
*G06F 15/18*    (2006.01)
*G06N 99/00*    (2010.01)

(52) U.S. Cl.
CPC .................................. *G06N 99/005* (2013.01)

(58) Field of Classification Search
None
See application file for complete search history.

(56) References Cited

U.S. PATENT DOCUMENTS

| 5,577,166 A | * | 11/1996 | Mizuno | G06K 9/6254 382/159 |
| 2006/0129395 A1 | * | 6/2006 | Thiesson | G06K 9/00523 704/240 |
| 2013/0185097 A1 | * | 7/2013 | Saria | G06Q 10/00 705/3 |

FOREIGN PATENT DOCUMENTS

| JP | 2001-236337 A | 8/2001 |
| JP | 2004-086896 A | 3/2004 |
| JP | 2004-094437 A | 3/2004 |
| JP | 2013-109550 A | 6/2013 |
| JP | 2013-114629 A | 6/2013 |

OTHER PUBLICATIONS

Kaastra et al. "Designing a neural network for forecasting financial and economic time series", Neurocomputing 10, 1996, pp. 215-236.*

(Continued)

*Primary Examiner* — Li-Wu Chang
(74) *Attorney, Agent, or Firm* — Squire Patton Boggs (US) LLP

(57) ABSTRACT

A time-series data prediction device includes an acquisition unit, a prediction model generation unit, and a prediction unit. The acquisition unit acquires a plurality of observation values that continue at predetermined time intervals, as a prediction data, from time-series data of an observation value of a predetermined observation target, and acquires a training data. The prediction model generation unit generates a prediction model to calculate time-series data, which is an observation value predicted based on given time-series data, using the training data. The prediction unit calculates a predicted value of an observation value using the generated prediction model and the prediction data.

7 Claims, 9 Drawing Sheets

(56) References Cited

OTHER PUBLICATIONS

Notice of Reasons for Rejection dated Nov. 1, 2016 corresponding to Japanese Patent Application No. 2013-220641 and English translation thereof.
Mitsutaka Fukuzawa, "Energy Management Package Enemap and Energy Saving Control Management Case," Yokogawa Technical Report, Yokogawa Electric Corporation, Sep. 15, 2006, vol. 50, No. 3, pp. 99-102.

* cited by examiner

FIG. 6

| TRAINING DATA FOR PREDICTION | FIRST FEATURE AMOUNT | | | | | POWER DEMAND |
|---|---|---|---|---|---|---|
| | $x_1$ | $x_2$ | $x_3$ | ------- | $x_m$ | |
| $D_0$ | ... | ... | ... | ------- | ... | ... |
| $D_1$ | ... | ... | ... | ------- | ... | ... |
| $D_2$ | ... | ... | ... | ------- | ... | ... |
| ⋮ | ⋮ | ⋮ | ⋮ | | ⋮ | ⋮ |
| $D_{dn}$ | ... | ... | ... | ------- | ... | ... |

FIG. 7

| TRAINING DATA FOR PREDICTION | SECOND FEATURE AMOUNT | | | | | POWER DEMAND |
|---|---|---|---|---|---|---|
| | $x_1$ | $x_2$ | $x_3$ | ------- | $x_s$ | |
| $D_0$ | ... | ... | ... | ------- | ... | ... |
| $D_1$ | ... | ... | ... | ------- | ... | ... |
| $D_2$ | ... | ... | ... | ------- | ... | ... |
| ⋮ | ⋮ | ⋮ | ⋮ | | ⋮ | ⋮ |
| $D_{dn}$ | ... | ... | ... | ------- | ... | ... |

…

TIME-SERIES DATA PREDICTION DEVICE OF OBSERVATION VALUE, TIME-SERIES DATA PREDICTION METHOD OF OBSERVATION VALUE, AND PROGRAM

CROSS-REFERENCE TO RELATED APPLICATION

Priority is claimed on Japanese Patent Application No. 2013-220641, filed on Oct. 23, 2013, and the content of which is incorporated herein by reference.

BACKGROUND OF THE INVENTION

Field of the Invention

The present invention relates to a time-series data prediction device, a time-series data prediction method, and a program.

Description of Related Art

Energy consumption prediction, in particular, a home energy consumption prediction system that predicts energy consumption in a house is disclosed in Japanese Unexamined Patent Application, First Publication No. 2013-109550, for example. In this technique, a database for storing time-series energy consumption information received from an energy consumption measuring device and an environment information collection device so as to be associated with each other is provided, and energy consumption in a house is predicted from the information received from the environment information collection device and the information in the database. Specifically, the power consumption of the target date is predicted by performing statistical processing, such as exponential smoothing average (ESMA), using data in a database.

SUMMARY OF THE INVENTION

In the related art described above, however, prediction accuracy is significantly influenced by the size of the exponential smoothing coefficient. For this reason, it has been difficult to accurately predict power consumption in both a case where days of the same power consumption continue and a case where days of significantly different power consumption continue. Therefore, it has been difficult to accurately predict the future observation value using the past observation value when there is a change in the observation value variation pattern.

An aspect of the present invention has been made in view of the aforementioned situation, and it is an object of the present invention to provide a time-series data prediction device, a time-series data prediction method, and a program for accurately predicting the future observation value using the past observation value of the observation target even if there is a change in the observation value variation pattern.

In order to achieve the aforementioned object, a time-series data prediction device, a time-series data prediction method, and a program according to aspects of the present invention adopt the following configurations.

(1) According to an aspect of the present invention, a time-series data prediction device that calculates a predicted value of an observation value based on time-series data of the observation value includes: an acquisition unit that acquires a plurality of observation values that continue at predetermined time intervals, as a prediction data, from time-series data of an observation value of a predetermined observation target and acquires a training data; a prediction model generation unit that generates a prediction model to calculate time-series data, which is an observation value predicted based on given time-series data, using the training data; and a prediction unit that calculates a predicted value of an observation value using the prediction model generated by the prediction model generation unit and the prediction data acquired by the acquisition unit.

According to the aspect of (1) described above, even if there is a change in the observation value variation pattern, the time-series data prediction device can calculate the predicted value of the observation value based on the time-series data observed in the past.

(2) In the aspect of (1) described above, the acquisition unit may acquire the plurality of observation values that continue at predetermined time intervals, as a prediction data, from the time-series data, acquire the plurality of observation values that continue at the predetermined time intervals, as a test data, from the time-series data excluding the prediction data, and acquire training data from the time-series data excluding the prediction data and the test data. The time-series data prediction device may further include an evaluation unit that evaluates a prediction accuracy of the prediction model generated by the prediction model generation unit using the test data.

According to the aspect of (2) described above, the time-series data prediction device can evaluate the prediction accuracy of the prediction model, which is generated based on the time-series data observed in the past, using the actually observed time-series data.

(3) In the aspect of (2) described above, the time-series data prediction device may further include a storage unit that stores a prediction model used in the past. The evaluation unit may compare at least a predicted value calculated by the prediction model acquired from the storage unit, a predicted value calculated by the prediction model generated by the prediction model generation unit, and a predicted value calculated by an average use prediction model to acquire a predicted value based on an average of time-series data of a predetermined period, using the test data. The prediction unit may calculate a predicted value of an observation value using a prediction model having a best result of the comparison of the evaluation unit and the prediction data acquired by the acquisition unit.

According to the aspect of (3) described above, even if there is a change in the observation value variation pattern, the time-series data prediction device can calculate the predicted value of the observation value by selecting the accurate prediction model according to the change.

(4) In any one of the aspects of (1) to (3) described above, the acquisition unit may search for time-series data whose correlation with the prediction data is higher than a predetermined value from the time-series data, and include the time-series data obtained by a search in the training data.

According to the aspect of (4) described above, since the time-series data prediction device generates a prediction model using the time-series data, which is highly correlated with time-series data used for prediction, as training data, it is possible to generate an accurate prediction model.

(5) In the aspect of (3) described above, when the average use prediction model is used in a previous prediction, the acquisition unit may include time-series data used as a prediction data in the previous prediction in the training data.

According to the aspect of (5) described above, since time-series data when it is determined that the variation pattern of the time-series data has become a new pattern is included in the training data, the time-series data prediction device can generate an accurate prediction model.

(6) In the aspect of (3) described above, the time-series data prediction device may further include a deviation amount detection unit that detects a record deviation amount that is a difference between an observation value and the predicted value calculated by the prediction unit using the prediction data. When the record deviation amount is smaller than a predetermined value and the prediction model generated by the prediction model generation unit is used to calculate the predicted value, the prediction unit may calculate a predicted value of an observation value with the average use prediction model when a difference between the observation value and a predicted value calculated by the average use prediction model using the prediction data used to calculate the predicted value is equal to or less than a predetermined value.

According to the aspect of (6) described above, when the accuracy of prediction based on the average use prediction model is good to some extent, the time-series data prediction device can reduce the load of calculation of the predicted value by using the average use prediction model for prediction.

(7) In any one of the aspects of (1) to (6) described above, the time-series data prediction device may further include a deviation amount detection unit that detects a record deviation amount that is a difference between an observation value and the predicted value calculated by the prediction unit. When the record deviation amount detected by the deviation amount detection unit is larger than a predetermined value, the acquisition unit may reselect the training data from the time-series data, and the prediction model generation unit may generate a prediction model using the training data reselected by the acquisition unit.

According to the aspect of (7) described above, when the prediction accuracy of the prediction result is not good, the time-series data prediction device can repeat the generation of the prediction model while changing the conditions until an accurate prediction model is obtained.

(8) According to another aspect of the present invention, a time-series data prediction device that calculates a predicted value of an observation value based on time-series data of the observation value includes: a clustering process unit that clusters time-series data of an observation value of a predetermined observation target into clusters that are a plurality of similar groups; a prediction model generation unit that generates a prediction model to calculate time-series data, which is an observation value predicted based on given time-series data, using the time-series data clustered into the clusters for each of the clusters clustered by the clustering process unit; and a prediction unit that predicts time-series data using the given time-series data and the prediction model generated for each of the clusters by the prediction model generation unit.

According to the aspect of (8) described above, the time-series data prediction device clusters time-series data, generates a good prediction model for each cluster from the past time-series data having a similar observation value variation pattern, and uses the prediction model for prediction. Therefore, it is possible to increase the prediction accuracy.

(9) In the aspect of (8) above, the prediction unit may combine prediction models generated for the respective clusters using a cluster proximity index indicating a probability that the given time-series data belongs to the cluster.

According to the aspect of (9) described above, even if there is a change in the observation value variation pattern, the time-series data prediction device can accurately calculate the predicted value of the time-series data.

(10) According to still another aspect of the present invention, a time-series data prediction method executed by a time-series data prediction device that calculates a predicted value of an observation value based on time-series data of the observation value includes: performing an acquisition process in which an acquisition unit acquires a plurality of observation values that continue at predetermined time intervals, as a prediction data, from time-series data of an observation value of a predetermined observation target and acquires a training data; performing a prediction model generation process in which a prediction model generation unit generates a prediction model to calculate time-series data, which is an observation value predicted based on given time-series data, using the training data; and performing a prediction process in which a prediction unit calculates a predicted value of an observation value using the prediction model generated in the prediction model generation process and the prediction data acquired in the acquisition process.

(11) According to still another aspect of the present invention, a time-series data prediction method executed by a time-series data prediction device that calculates a predicted value of an observation value based on time-series data of the observation value includes: performing a clustering process in which a clustering process unit clusters time-series data of an observation value of a predetermined observation target into clusters that are a plurality of similar groups; performing a prediction model generation process in which a prediction model generation unit generates a prediction model to calculate time-series data, which is an observation value predicted based on given time-series data, using the time-series data clustered into the clusters for each of the clusters clustered in the clustering process; and performing a prediction process in which a prediction unit predicts time-series data using the given time-series data and the prediction model generated for each of the clusters in the prediction model generation process.

(12) According to still another aspect of the present invention, there is provided a program causing a computer, which is used as a time-series data prediction device that calculates a predicted value of an observation value based on time-series data of the observation value, to function as: an acquisition unit that acquires a plurality of observation values that continue at predetermined time intervals, as a prediction data, from time-series data of an observation value of a predetermined observation target and acquires a training data; a prediction model generation unit that generates a prediction model to calculate time-series data, which is an observation value predicted based on given time-series data, using the training data; and a prediction unit that calculates a predicted value of an observation value using the prediction model generated by the prediction model generation unit and the prediction data acquired by the acquisition unit.

(13) According to still another aspect of the present invention, there is provided a program causing a computer, which is used as a time-series data prediction device that calculates a predicted value of an observation value based on time-series data of the observation value, to function as: a clustering process unit that clusters time-series data of an observation value of a predetermined observation target into clusters that are a plurality of similar groups; a prediction model generation unit that generates a prediction model to calculate time-series data, which is an observation value predicted based on given time-series data, using the time-series data clustered into the clusters for each of the clusters clustered by the clustering process unit; and a prediction unit that predicts time-series data using the given time-series data and the prediction model generated for each of the clusters by the prediction model generation unit.

According to the aspects of the present invention, even if there is a change in the observation value variation pattern, it is possible to accurately predict the future observation value using the past observation value of the observation target.

BRIEF DESCRIPTION OF THE DRAWINGS

FIG. 6 is a diagram showing a first feature amount table according to the embodiment.

FIG. 7 is a diagram showing a second feature amount table according to the embodiment.

DESCRIPTION OF EMBODIMENTS

Figure 1:
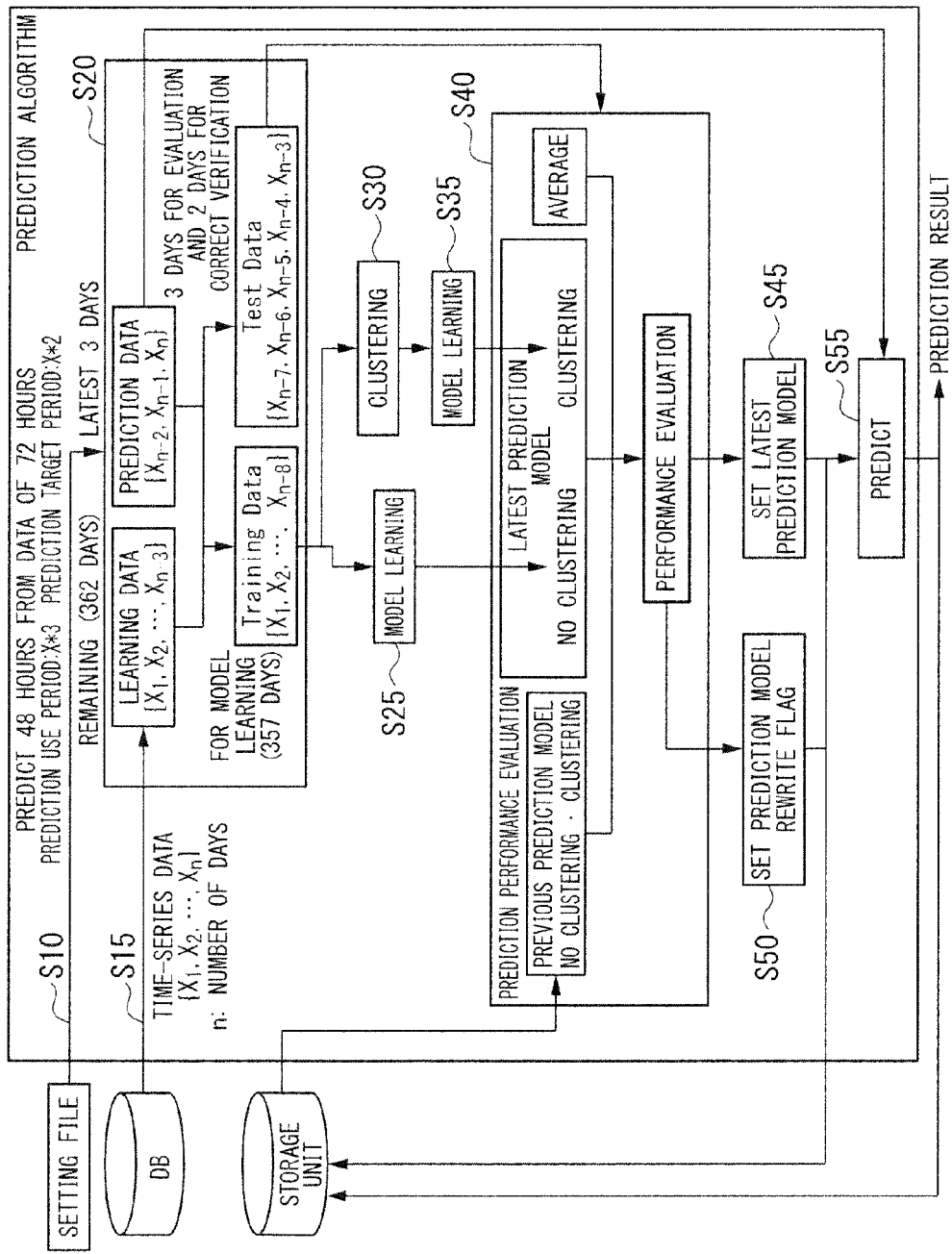
FIG. 1 is a diagram showing a time-series data prediction algorithm performed by a time-series data prediction device according to an embodiment of the present invention.

Hereinafter, an embodiment of the present invention will be described with reference to the accompanying diagrams.
[Outline of Prediction Algorithm]
FIG. 1 is a diagram showing a time-series data prediction algorithm performed by a time-series data prediction device according to an embodiment of the present invention. In the present embodiment, a case of time-series data of the observation value of the energy demand in a house will be described as an example.

First, a time-series data prediction device reads a prediction use period and a prediction target period from the setting file stored in advance (step S10). In the present embodiment, a case will be described in which time-series data is data indicating the observation value of the energy demand of consecutive 1-minute intervals in a day, a reading target period is 365 days, a prediction use period is 3 days (72 hours), and a prediction target period is 2 days (48 hours).

The time-series data prediction device reads the latest past time-series data $X_1, X_2, \ldots, X_n$ (n=365) of the reading target period of 365 days from a database DB (step S15). The time-series data prediction device sets the latest time-series data $X_{n-2}, X_{n-1}$, and $X_n$ of the prediction use period of 3 days, among the read time-series data, as prediction data used for the prediction of time-series data of the future prediction target period of 2 days, and sets the time-series data $X_1, X_2, \ldots, X_{n-3}$ of the remaining 362 days as learning data used for the learning of a prediction model. The prediction model is a calculation expression for calculating the predicted value of time-series data of the prediction target period subsequent to the time-series data of the prediction use period by inputting the time-series data of the prediction use period as an input parameter.

In addition, the time-series data prediction device sets the consecutive time-series data $X_{n-7}, X_{n-6}, X_{n-5}, X_{n-4}$, and $X_{n-3}$ of 5 days as a sum of the prediction use period and the prediction target period, among the learning data, as test data, and sets the remaining time-series data $X_1, X_2, \ldots, X_{n-8}$ as training data. The time-series data prediction device sets the time-series data $X_{n-7}, X_{n-6}$, and $X_{n-5}$ of the prediction use period of 3 days, among the test data, as test data for evaluation, and sets the time-series data $X_{n-4}$ and $X_{n-3}$ of the subsequent prediction target period of 2 days as test data for correct verification (step S20).

The time-series data prediction device learns a prediction model using all pieces of training data (step S25). This prediction model is written as a "no-cluster prediction model". In addition, the time-series data prediction device clusters the training data (step S30), and learns the prediction model of each cluster (step S35). This prediction model of each cluster is written as a "cluster-specific prediction model".

The time-series data prediction device calculates prediction results based on the latest prediction model, a previous prediction model, and an average use prediction model using the test data for evaluation of the test data. The latest prediction model is a no-cluster prediction model generated in step S25 and a cluster-specific prediction model generated in step S35. The previous prediction model is a no-cluster prediction model or a cluster-specific prediction model used for previous prediction. The average use prediction model is a prediction model that uses an average of the consecutive time-series data of the prediction use period. The time-series data prediction device collates the calculated prediction results with test data for correct verification, and selects a prediction model with the smallest error (step S40).

Since the latest prediction model is a prediction model that reflects the latest power changes, prediction can be performed with high accuracy when there is no particular large change recently. On the other hand, the previous prediction model is a prediction model having a record of good accuracy. Since the previous prediction model is a slightly previous prediction model in many cases, prediction can be performed with high accuracy when there is a large power change recently. When the pattern of power use has changed, for example, when summer vacation begins, the use of the average use prediction model makes it easy to follow the change.

When the no-cluster prediction model generated in step S25 is selected, the time-series data prediction device writes a no-cluster prediction model in a storage unit provided therein, and sets a prediction model rewrite flag to ON and sets a clustering flag to OFF (steps S45 and S50).

In addition, when the cluster-specific prediction model generated in step S35 is selected, the time-series data prediction device writes a cluster-specific prediction model in the storage unit provided therein, and sets the prediction model rewrite flag and the clustering flag to ON (steps S45 and S50).

In addition, when the previous prediction model is selected, the time-series data prediction device sets the prediction model rewrite flag to OFF, and sets the clustering flag to the same state (step S50).

The time-series data prediction device calculates a prediction result of the time-series data of the future prediction target period of 2 days based on the selected prediction model using the prediction data (time-series data $X_{n-2}$, $X_{n-1}$, and $X_n$), and outputs the calculated prediction result (step S55).

[Overall Configuration]

Figure 2:
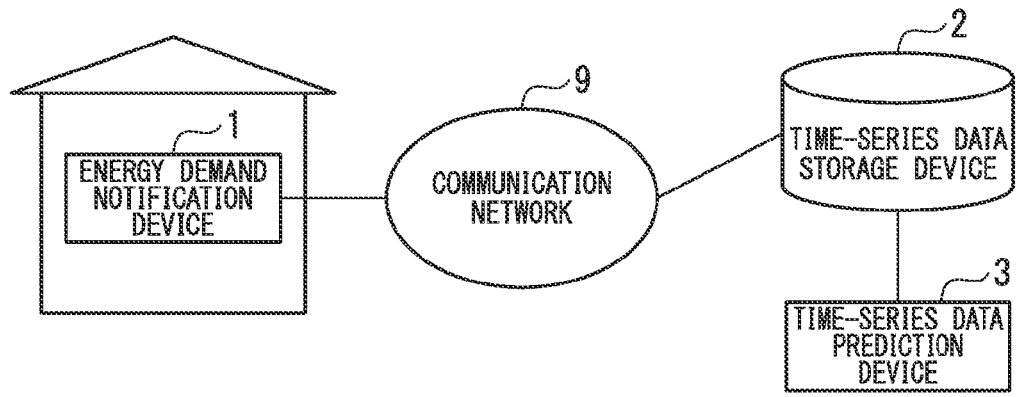
FIG. 2 is a block diagram showing the configuration of a time-series data prediction system according to the embodiment.

FIG. 2 is a block diagram showing the configuration of a time-series data prediction system according to an embodiment of the present invention, and only the functional block related to the present embodiment is extracted and shown. The time-series data prediction system shown in FIG. 2 is configured to include an energy demand notification device 1 provided in the house or the like, a time-series data storage device 2, and a time-series data prediction device 3. The energy demand notification device 1 and the time-series data storage device 2 are connected to each other through a communication network 9.

The energy demand notification device 1 acquires the observation value of the energy demand in a house from a sensor attached to the power distribution board in the house at predetermined time intervals, for example. The energy demand notification device 1 notifies the time-series data storage device 2 of the acquired observation value of the energy demand and observation data indicating the acquisition date and time of the observation value. The energy demand that is an observation target is, for example, a power demand, a heat demand, or an electric vehicle (EV) demand.

The time-series data storage device 2 is a database realized by one or more computer devices, and stores the observation data of the energy demand notified from the energy demand notification device 1 as time-series data.

Figure 3:
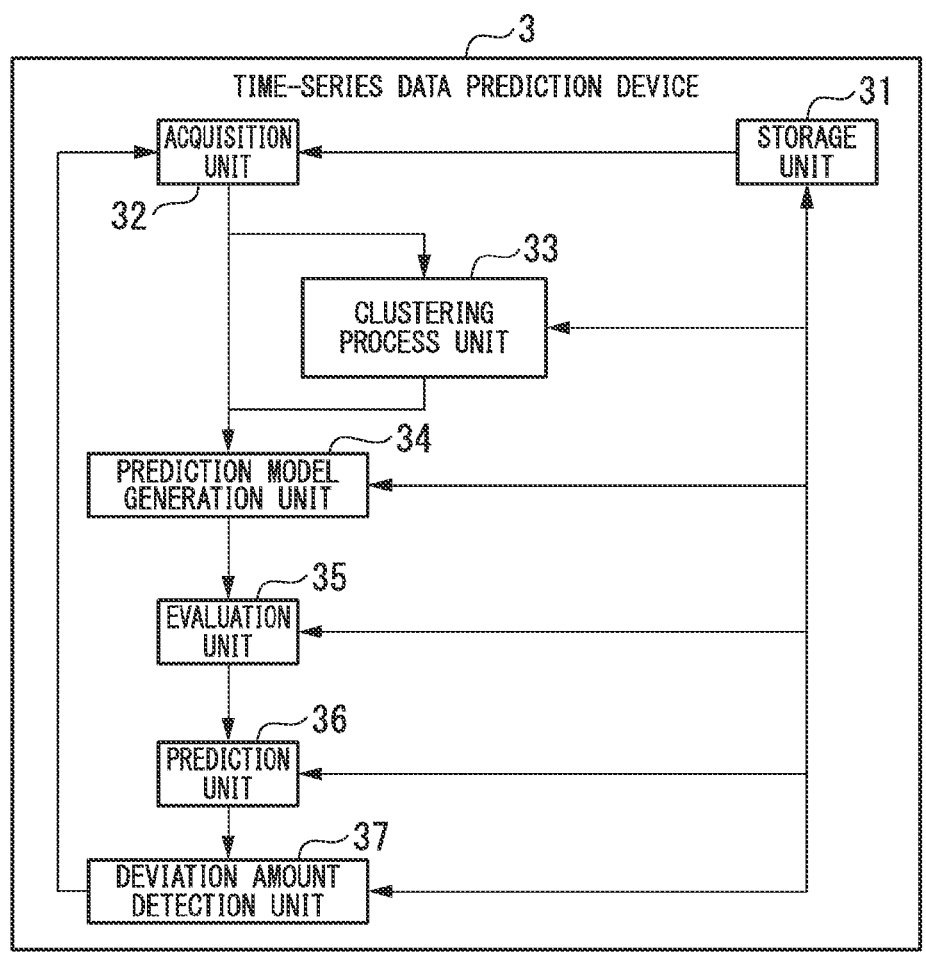
FIG. 3 is a block diagram showing the internal configuration of the time-series data prediction device according to the embodiment.

FIG. 3 is a block diagram showing the internal configuration of the time-series data prediction device 3, and only the functional block related to the present embodiment is extracted and shown. The time-series data prediction device 3 is realized by one or more computer devices, and is configured to include a storage unit 31, an acquisition unit 32, a clustering process unit 33, a prediction model generation unit 34, an evaluation unit 35, a prediction unit 36, and a deviation amount detection unit 37.

The storage unit 31 stores various kinds of data, such as time-series data of the observation value of the energy demand read from the time-series data storage device 2, a setting file in which the conditions when performing energy demand prediction are described, a previous prediction model, and a prediction model used for demand prediction. The type of prediction model used for demand prediction is shown by the clustering flag, the rewrite flag, and the average flag. The clustering flag indicates whether or not the latest prediction model or the previous prediction model selected as a prediction model used for demand prediction is a cluster-specific prediction model. The rewrite flag indicates whether or not the previous prediction model has been selected as a prediction model used for demand prediction. The average flag indicates whether or not the average use prediction model has been selected as a prediction model used for demand prediction.

The acquisition unit 32 reads time-series data from the time-series data storage device 2. According to the setting file, the acquisition unit 32 divides the read time-series data into prediction data used for the prediction of energy demand and learning data used for the generation of a prediction model, and further divides the learning data into training data used for the model learning of the latest prediction model (no-cluster prediction model and cluster-specific prediction model) and test data used for the evaluation of a prediction model.

The clustering process unit 33 clusters the training data acquired by the acquisition unit 32. The prediction model generation unit 34 generates a no-cluster prediction model using all pieces of the training data acquired by the acquisition unit 32, and generates a cluster-specific prediction model using the training data clustered by the clustering process unit 33.

The evaluation unit 35 calculates prediction results based on various prediction models using the test data for evaluation acquired by the acquisition unit 32, collates the calculated prediction results with test data for correct verification, and selects a prediction model with the smallest error. The various prediction models are the no-cluster prediction model and the cluster-specific prediction model generated by the prediction model generation unit 34, the no-cluster prediction model or the cluster-specific prediction model stored in the storage unit 31 as a previous prediction model, and the average use prediction model. The evaluation unit 35 writes information, which indicates the type of the prediction model selected for demand prediction, in the storage unit 31. When the selected prediction model is the latest prediction model, the evaluation unit 35 writes the selected latest prediction model in the storage unit 31.

The prediction unit 36 calculates a prediction result of the time-series data based on the prediction model selected by the evaluation unit 35 using the prediction data acquired by the acquisition unit 32, and outputs the calculated prediction result. The deviation amount detection unit 37 detects a record deviation amount that is the difference between the predicted value calculated by the prediction unit 36 using the prediction data and the observation value.

The time-series data storage device 2 and the time-series data prediction device 3 may be realized by one computer device.

[Overall Flow]

Figure 4:
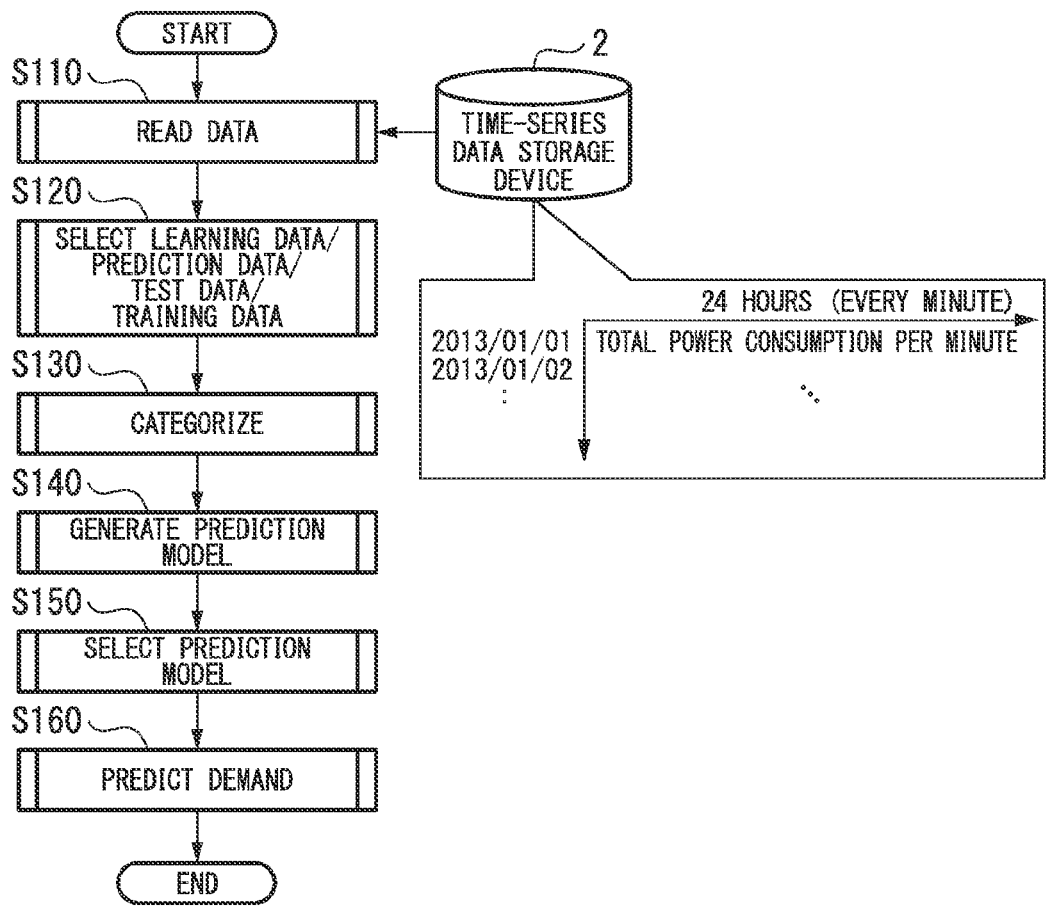
FIG. 4 is a flowchart showing the operation in the time-series data prediction process of the time-series data prediction device according to the embodiment.

FIG. 4 is a flowchart showing the operation in the time-series data prediction process of the time-series data prediction device 3. When the energy demand notification device 1 notifies the observation data of power demand, heat demand, and EV demand as energy demand, the time-series data prediction device 3 performs the process of FIG. 4 for each of the power demand, the heat demand, and the EV demand.

First, the acquisition unit 32 of the time-series data prediction device 3 reads the latest past time-series data $X_1, \ldots, X_n$ (n=365) of 365 days from the time-series data storage device 2 (step S110). Each piece of the time-series data is expressed by a vector having elements that are observation values of the energy demand of consecutive 1-minute intervals in a day. In addition, a unit (for example, one day of consecutive observation values of 1-minute intervals) of time-series data or a reading period (for example, 365 days) of time-series data may be read from the setting file stored in the storage unit 31. The acquisition unit 32 writes the read time-series data in the storage unit 31.

According to the prediction use period and the prediction target period described in the setting file, the acquisition unit 32 sets the latest time-series data of the prediction use period, among the read time-series data, as prediction data, and sets the remaining time-series data as learning data. In addition, the acquisition unit 32 sets the consecutive time-series data of days, the number of which is the sum of the prediction use period and the prediction target period, among the learning data, as test data, and sets the remaining time-series data as training data (step S120).

Here, the acquisition unit 32 sets the latest time-series data $X_{n-2}$, $X_{n-1}$, and $X_n$ of the prediction use period of 3 days as prediction data, and sets the time-series data $X_1, X_2, \ldots, X_{n-3}$ of the remaining 362 days as learning data. In addition, the acquisition unit 32 sets the time-series data $X_{n-7}$, $X_{n-6}$, $X_{n-5}$, $X_{n-4}$, and $X_{n-3}$ (from the newest data of the learning data) of 5 days as a sum of the prediction use period of 3 days and the prediction target period of 2 days, among the learning data, as test data, and sets the remaining time-series data $X_1, X_2, \ldots, X_{n-8}$ as training data. Then, the acquisition unit 32 sets the time-series data $X_{n-7}$, $X_{n-6}$, and $X_{n-5}$ (from the oldest data of the test data) of the prediction use period of 3 days as test data for evaluation, and sets the time-series data $X_{n-4}$ and $X_{n-3}$ of the subsequent prediction target period of 2 days as test data for correct verification.

In order to generate a prediction model to estimate each element (observation value) of the time-series data of the prediction use period, a set of known feature amounts and elements of time-series data are required. Therefore, the acquisition unit 32 generates training data for prediction, which is time-series data that continues only for the prediction use period, from the training data, and sets the time-series data of the prediction target period subsequent to the generated training data for prediction as training data for correct answer acquisition.

For example, the acquisition unit 32 may set the training data for prediction such that the time-series data included does not overlap each other as time-series data $X_1$ to $X_3$, time-series data $X_4$ to $X_6$, time-series data $X_7$ to $X_9$, . . . , or may set the training data for prediction such that the time-series data included is shifted from each other by one day as time-series data $X_1$ to $X_3$, time-series data $X_2$ to $X_4$, time-series data $X_3$ to $X_5$, . . . .

The clustering process unit 33 performs categorizing for cluster division of the training data for prediction acquired by the acquisition unit 32 (step S130). Then, the clustering process unit 33 generates multidimensional data for clustering that includes a feature amount for clustering obtained from the training data for prediction. The feature value for clustering is a value (for example, an average value of the power demand of 15-minute intervals or a difference between the maximum and minimum values of the power demand) calculated from the elements of the time-series data included in the training data for prediction or the elements of the time-series data included in the training data for prediction. In addition, the clustering process unit 33 may use the training data for prediction as it is as multidimensional data for clustering. The clustering process unit 33 performs cluster division of the learning data according to a k-means method or a self-organizing map method using the generated multidimensional data for clustering. A number determined in advance according to the number of pieces of learning data may be used as the number of clusters, or the number of clusters may be determined using a known method of determining the number of clusters. Known methods of determining the number of clusters include a method of performing cluster analysis in several ways by changing the number of clusters and determining the optimal number of clusters based on predetermined criteria, a method of performing classification of a small number of clusters using the k-means method and then further dividing each cluster until it is determined that division is not appropriate using the k-means method, and the like. The clustering process unit 33 writes the cluster of the training data for prediction so as to match the training data for prediction of the storage unit 31.

The prediction model generation unit 34 learns a no-cluster prediction model using all of the training data for prediction and the training data for correct answer acquisition, and generates a cluster-specific prediction model using the training data for prediction belonging to the cluster and the training data for correct answer acquisition for each clustering (step S140). The prediction model learned by the prediction model generation unit 34 is configured by an approximation model to calculate the predicted value of each observation value of the time-series data of the prediction use period from the time-series data of the prediction use period. Each approximation model is a prediction expression of the energy demand using only the feature amount, which is determined to affect the prediction of the observation value, as an input parameter. In addition, the details of the prediction model generation process will be described later.

Using the test data for evaluation (time-series data $X_{n-7}$, $X_{n-6}$, and $X_{n-5}$), the evaluation unit 35 calculates prediction results based on the no-cluster prediction model and the cluster-specific prediction model, which are the latest prediction models generated in step S140, and the previous prediction model (previous no-cluster prediction model or previous cluster-specific prediction model) and the average use prediction model stored in the storage unit 31. The evaluation unit 35 collates the calculated prediction results with the test data for correct verification (time-series data $X_{n-4}$ and $X_{n-3}$), and selects a prediction model with the smallest error (step S150). When the latest prediction model is selected, the evaluation unit 35 may write both the no-cluster prediction model and the cluster-specific prediction model in the storage unit 31.

When a no-cluster prediction model is selected, the evaluation unit 35 writes the no-cluster prediction model in the storage unit 31, and sets the prediction model rewrite flag of the storage unit 31 to ON and sets the clustering flag and the average flag to OFF. When a cluster-specific prediction model is selected, the evaluation unit 35 writes the cluster-specific prediction model in the storage unit 31, and sets the prediction model rewrite flag and the clustering flag of the storage unit 31 to ON and sets the average flag to OFF. When the previous prediction model is selected, the evaluation unit 35 sets the prediction model rewrite flag and the average flag of the storage unit 31 to OFF, and sets the clustering flag to the same state. When the average use prediction model is selected, the evaluation unit 35 sets the average flag of the storage unit 31 to ON.

The prediction unit 36 calculates a prediction result using the prediction data (time-series data $X_{n-2}$, $X_{n-1}$, and $X_n$) based on the prediction model selected by the evaluation unit 35 in step S150, and outputs the calculated prediction result (step S160). For example, the time-series data prediction device 3 selects a prediction model by performing the process of steps S110 to S150 once a day.

Then, the prediction unit of the time-series data prediction device 3 outputs a prediction result between the current time and 24 hours ahead of the current time from the prediction result of 48 hours that has been calculated using the prediction data by the prediction model selected by the evaluation unit 35 every hour.

In the above description, the last time-series data of the prediction data is set as test data, and is not used for the learning of the prediction model. However, if data close to the latest usage condition is included in the training data, it is possible to generate a prediction model with high prediction accuracy. Therefore, the acquisition unit 32 may calculate a correlation between the prediction data and the consecutive time-series data of 3 days of the prediction use period included in the learning data, and select only data, which is determined to have a correlation higher than a predetermined value, as training data for prediction. That is, the acquisition unit 32 includes training data for prediction, which is the consecutive time-series data of 3 days of the prediction use period highly correlated with the prediction data, and training data for correct answer acquisition of the prediction target period of 2 days, which is subsequent to the training data for prediction, in the training data. In this case, the time-series data prediction device 3 may reduce the number of clusters compared with a case where training data is acquired without calculating a correlation, or may not generate the cluster-specific prediction model.

In addition, when the average use prediction model has been used previously, it is thought that a new time-series pattern that has not been present before has appeared. Therefore, when the average flag of the storage unit 31 is set to ON, the acquisition unit 32 may include the last prediction data and data of a predetermined number of previous days in the training data.

The acquisition unit 32 may acquire test data so that the consecutive time-series data of the same day of the week as the prediction data, among the learning data, becomes test data for evaluation.

In the above description, the acquisition unit 32 acquires training data including the training data for prediction and the training data for correct answer acquisition so as not to overlap test data and prediction data. However, the training data for correct answer acquisition may include the test data. In addition, the test data may include the prediction data.

Until the next latest prediction model is generated after the output of the prediction result, the deviation amount detection unit 37 reads the observation value of the power demand in the prediction date and time from the time-series data storage device 2, and detects a record deviation amount that is the difference between the read observation value and the predicted value output from the prediction unit 36.

The deviation amount detection unit 37 instructs the acquisition unit 32 to redo the generation of the prediction model when the detected record deviation amount is larger than a predetermined value. Then, the time-series data prediction device 3 changes the conditions to repeat the process from step S120 or S130.

When the record deviation amount exceeds the predetermined criteria by which the deviation amount is determined to be large, the acquisition unit 32 reselects learning data in step S120. The acquisition unit 32 includes time-series data of the new predetermined period of the learning data in the training data. For example, the acquisition unit 32 may set time-series data $X_{n-(1+4)}$ to $X_n$ among the time-series data $X_1, X_2, \ldots, X_{n-3}$ included in the learning data, as training data, and set time-series data $X_1$ to $X_{n-(i+5)}$ and $X_{n-(i+1)}$ to $X_{n-3}$ as training data.

Alternatively, the acquisition unit 32 may include training data for prediction, which is the consecutive time-series data of 3 days of the prediction use period highly correlated with the prediction data, and training data for correct answer acquisition, which is subsequent to the training data for prediction, in the training data.

Alternatively, the time-series data prediction device 3 may change the prediction use period or the prediction target period, or may includes the last prediction data in the training data as described above.

In addition, when the record deviation amount exceeds the predetermined criteria by which the deviation amount is determined to be the middle level or so, the clustering process unit 33 redoes the calculation of the prediction model by changing the number of clusters or the like from step S130.

When the record deviation amount is smaller than a predetermined value, the average flag of the storage unit 31 is OFF, and prediction models (a no-cluster prediction model, a cluster-specific prediction model, and a previous prediction model) other than the average use prediction model are used for the predicted value calculation of the prediction unit 36, the deviation amount detection unit 37 calculates the difference between the observation value and the predicted value that is calculated by the average use prediction model using the prediction data. When the calculated difference is equal to or less than a predetermined value, the prediction unit 36 calculates the predicted value of the time-series data using the average use prediction model until the next latest prediction model is generated. As a result, the amount of calculation of the predicted value is reduced.

After the observation value of the date and time corresponding to the prediction result output from the prediction unit 36 is obtained, the evaluation unit 35 may evaluate the prediction model and rewrite various flags of the storage unit 31 afterward. That is, using the prediction data that is used when acquiring a prediction result, the evaluation unit 35 calculates a prediction result based on each of the cluster-specific prediction model, the cluster prediction model, the previous prediction model, and the average use prediction model, and selects a prediction model with the smallest error for the observation value. According to the selected prediction model, the evaluation unit 35 rewrites the prediction model rewrite flag, the clustering flag, and the average flag of the storage unit 31 similar to the process of step S150. When the cluster-specific prediction model or the cluster prediction model is selected, the evaluation unit 35 rewrites the selected prediction model in the storage unit 31.

Next, the detailed operation of the prediction model generation unit 34, the evaluation unit 35, and the prediction unit 36 will be described.

[Detailed Configuration and Operation of the Prediction Model Generation Unit 34]

Figure 5:
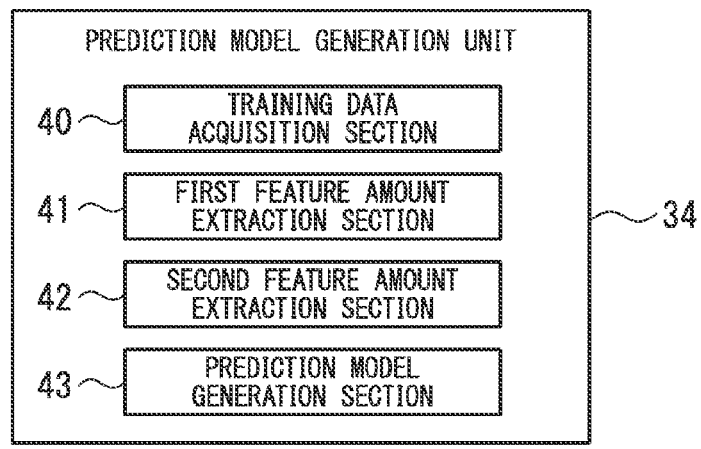
FIG. 5 is a block diagram showing the detailed configuration of a prediction model generation unit according to the embodiment.

FIG. 5 is a block diagram showing the detailed configuration of the prediction model generation unit 34. In FIG. 5, the prediction model generation unit 34 is configured to include a training data acquisition section 40, a first feature amount extraction section 41, a second feature amount extraction section 42, and a prediction model generation section 43.

The training data acquisition section 40 acquires training data for prediction, which is used to generate a no-cluster prediction model or a cluster-specific prediction model, and training data for correct answer acquisition corresponding to the training data for prediction.

The first feature amount extraction section 41 acquires the feature amount from the training data for prediction that is used for the learning of the approximation model that configures the prediction model, and reads the power demand from the training data for correct answer acquisition subsequent to the training data for prediction. The first feature amount extraction section 41 generates a first feature amount table shown in FIG. 6 that is written in a feature amount table template set in advance such that the feature amount and the power demand match each other.

FIG. 6 shows the first feature amount, which includes feature amounts $x_1$ to $x_m$ extracted for training data for prediction $D_0$ to $D_{dn}$ used for the learning of the approximation model, and the power demand acquired from the corresponding training data for correct answer acquisition. Training data for prediction itself may be described in the first feature amount table, or identification information of the training data for prediction may be described in the first feature amount table. In addition, the power demand is acquired from the training data for correct answer acquisition corresponding to the training data for prediction.

The second feature amount extraction section 42 shown in FIG. 5 performs model learning using a method in which Automatic Relevance Determination (ARD) is used for model learning, for example, a method of Variational Bayesian Sparse Regression (VBSR), and extracts the second feature amount from the first feature amount by removing the feature amount, which does not contribute to the estimation of the power demand, from the first feature amount (which will be described in detail later).

The second feature amount extraction section 42 generates a second feature amount table shown in FIG. 7 by writing the second feature amount, which is extracted for each piece of training data for prediction used for the learning of the approximation model, and the power demand, which is acquired from the training data for correct answer acquisition subsequent to the training data for prediction, in a feature amount table template set in advance.

Similar to FIG. 6, FIG. 7 shows feature amounts $x_1$ to $x_s$ extracted for the training data for prediction $D_0$ to $D_{dn}$ and the power demand. Here, m>s.

The prediction model generation section 43 shown in FIG. 5 generates an approximation model, which is approximated from a plurality of functions (basis functions) and weighting coefficients of the functions, from the second feature amount and the power demand of the second feature amount table. Here, the prediction model generation section 43 performs a process of model learning for calculating the coefficient (Kriging coefficient in the case of a Kriging method) of each basis function of the approximation model so as to pass through the feature amount using a Kriging method, a Support Vector Regression (SVR) method, or the like (which will be described later). The prediction model generation section 43 generates a prediction model from the approximation model to predict each observation value of the time-series data of the prediction use period.

Hereinafter, a reduction process of the feature amount, which does not contribute to the calculation of the power demand, in the first feature amount that is performed by the second feature amount extraction section 42 will be described. In the following explanation, a case where the model learning of the approximation model based on the VBSR method is used will be described as an example of the method of ARD.

The second feature amount extraction section 42 performs model learning using the prediction approximation expression of VBSR based on Expression (1) shown below, that is, reduction processing of the feature amount used in the approximation model.

[Expression 1]

$$y_{mean} = \mu + \sum_{i=1}^{D} \theta_i x_i \quad (1)$$

In Expression (1), $y_{mean}$ is an average value of the power demand, $x_i$ is a feature amount, $\mu$ is a bias, $\theta_i$ is a weighting coefficient of the feature amount $x_i$, and D is the number of types of the effective feature amount x at the time of prediction using a model expression. The prediction approximation expression of Expression (1) is expressed by a simple linear combination of the feature amount and the weighting coefficient, and is a straight line in one dimension and is a flat surface in two dimensions.

In order to calculate the weighting coefficient having a relationship of Expression (1), the second feature amount extraction section 42 performs the following calculation.

First, the posterior distribution shown in Expression (2) in Bayesian estimation is shown as Expression (3) by factorization using the variational Bayesian method. That is, the probability distribution is calculated by using the hidden variable $\alpha$ and the weighting coefficient $\theta$ as random variables for the power demand (y).

$P(\theta,\alpha|y)$ is a posterior probability showing a set of $\theta$ and $\alpha$ in the case of the average power demand. In addition, $P(y|\theta)$ is a prior probability of the average power demand in the case of $\theta$, $P(\theta|\alpha)$ is a prior probability of $\theta$ in the case of $\alpha$, and $P(\alpha)$ is a prior probability of $\alpha$.

[Expression 2]

$$P(\theta, \alpha | y) = \frac{\int P(y|\theta)P(\theta|y)P(\alpha)d\alpha}{\int\int P(y|\theta)P(\theta|\alpha)P(\alpha)d\alpha d\theta} \quad (2)$$

[Expression 3]

$$P(\theta, \alpha | y) = Q(\theta)Q(\alpha) \quad (3)$$

For Expression (3), the second feature amount extraction section 42 calculates $Q(\theta)$ and $Q(\alpha)$, with which $E(Q(\theta))$ and $E(Q(\alpha))$ are maximized, using the following Expressions (4) and (5) based on Laplace approximation, respectively.

[Expression 4]

$$E(Q(\theta)) = \log Q(\theta) \approx -\frac{1}{2}(\theta - \bar{\theta})^t H(\theta - \bar{\theta}) + const \quad (4)$$

[Expression 5]

$$E(Q(\alpha)) = \log Q(\alpha) = \sum_{i=1}^{D}\left[-\frac{1}{2}\langle\theta_i^2\rangle_{Q(\theta)}\alpha_i - \frac{1}{2}\log\alpha_i\right] + const \quad (5)$$

In Expression (4), H is a Hessian matrix. In Expression (5), $\langle\theta_i^2\rangle_{Q(\theta)}$ indicates an expected value of $\theta_i^2$ in $Q(\theta)$.

Then, the second feature amount extraction section 42 performs initialization as $\alpha_i=1$ (i=1, 2, . . . , D) and $\theta_i=0$ (i=1, 2, . . . , D), calculates a gradient $\partial E/\partial\theta$, and calculates a Hessian matrix from the gradient by $\partial E^2/\partial\theta\partial\theta^t$. In the Hessian matrix, $\theta^t$ is a transposed matrix of $\theta$.

Then, the second feature amount extraction section 42 sequentially updates θ in Expression (4) using the Newton's method. In addition, the second feature amount extraction section 42 calculates and updates α from Expression (5) using the updated θ.

Then, after the update, the second feature amount extraction section 42 deletes θ$_i$ less than the reduction threshold value set in advance, newly calculates ∂E/∂θ, calculates a Hessian matrix by ∂E²/∂θ∂θ$^t$, and performs an update process of θ and α using Expressions (4) and (5). Here, the reduction threshold value is set in advance as a value of the coefficient θ that is experimentally determined through the simulation result or the like and that is determined not to contribute to the estimation of the power demand.

Then, the second feature amount extraction section 42 calculates the gradient described above until θ$_i$ less than the reduction threshold value is not present, and repeats the process of updating θ and α.

When θ$_i$ less than the reduction threshold value is not present, the second feature amount extraction section 42 deletes the power demand in the first feature amount, and generates the second feature amount table shown in FIG. 7 by newly setting the remaining feature amount as the second feature amount.

Next, the approximation model preparation process based on the model learning using the second feature amount, which is performed by the prediction model generation section 43, will be described. In the following explanation, a case where the model learning based on the Kriging method is used will be described as an example.

The prediction model generation section 43 finally obtains a Kriging prediction expression as an approximation model shown in the following Expression (6). Expression (6) is an approximation model to estimate a predicted value y$_a$ that is related to a function f$_i$(x$_i$) of the feature amount x$_i$ and the weighting coefficient C$_i$.

[Expression 6]

$$y_a = C_0 + \sum_{i=1}^{N} C_i f_i(x_i) \quad (6)$$

In Expression (6), the weighting coefficient C$_i$ and the function f$_i$(x$_i$) are expressed by the following Expressions (7) and (8), respectively. The subscript i is a number indicating the training data for prediction used when generating the approximation model.

[Expression 7]

$$C_i = (R(x_i, x_j)^{-1}(y_a - I\mu)) \quad (7)$$

[Expression 8]

$$f_i(x_i) = R(x, x_i) \quad (8)$$

In Expression (7), R(x$_i$, x$_j$)$^{-1}$ is an inverse matrix of the spatial correlation matrix of the feature amount, and the spatial correlation matrix R(x$_i$, x$_j$) is expressed by the following Expressions (9) and (10). R(x, x$_i$) is a matrix showing the spatial positional relationship between the feature amount in prediction and the feature amount in the second feature amount, and R(x$_i$, x$_j$) is a matrix showing the positional relationship between the feature amounts in the second feature amount. In addition, the coefficient β in Expression (9) is expressed by the following Expression (10).

[Expression 9]

$$R(x_i, x_j) = \prod_{d=1}^{D} e^{-\beta} \quad (9)$$

[Expression 10]

$$\beta = \theta^d |x_i^d - x_j^d|^{p^d} \quad (10)$$

D in Expression (9) is the number of feature amounts that configure the approximation model, and the subscript d in Expression (10) indicates the number of the feature amount. θ is a Kriging coefficient, and is a numeric value that determines the range of influence of spatial correlation. p is a numeric value that determines the smoothness of the relationship of the spatial correlation.

In addition, a vertical matrix r$_i$ in the spatial correlation matrix R in Expression (9) is expressed by the following Expression (11). In Expression (11), the subscript t indicates a transposed matrix.

[Expression 11]

$$r_i^t = (R(x, x_1), R(x, x_2), \ldots, R(x, x_N)) \quad (11)$$

In Expression (6), the bias C$_0$ is expressed by the following Expression (12). In Expression (12), I is a unit vector.

[Expression 12]

$$C_0 = \frac{I^t R(x_i, x_j)^{-1} y}{I^t R(x_i, x_j)^{-1} I} \quad (12)$$

The Kriging coefficient θ is calculated for each feature amount x$^d$, and is determined so as to maximize the likelihood Ln by the following Expression (13).

[Expression 13]

$$\ln(Ln) = -\tfrac{1}{2}\ln(\sigma^{-2}) - \tfrac{1}{2}\ln|R(x_i, x_j)| \quad (13)$$

In Expression (13), the approximate variance σ² is calculated by Expression (14). In Expression (14), N is the number of pieces of training data used to generate the approximation model described above.

[Expression 14]

$$\sigma^2 = \frac{(y - I\mu)^t R(x_i, x_j)^{-1}(y - I\mu)}{N} \quad (14)$$

The prediction model generation section 43 calculates the Kriging coefficient θ, with which the above-described ln(Ln) is maximized, for each feature amount. As an optimization method of the Kriging coefficient θ and the coefficient p, a gradient method, a simulated annealing method, and a genetic algorithm are used while using Expression (13). In the present embodiment, in order to prevent converging on a locally optimal solution, a global search is performed using the genetic algorithm. Then, the simulated annealing method is used so that ln(Ln) converges on the maximum.

Next, the operation of the prediction model generation unit 34 will be described.

Figure 8:
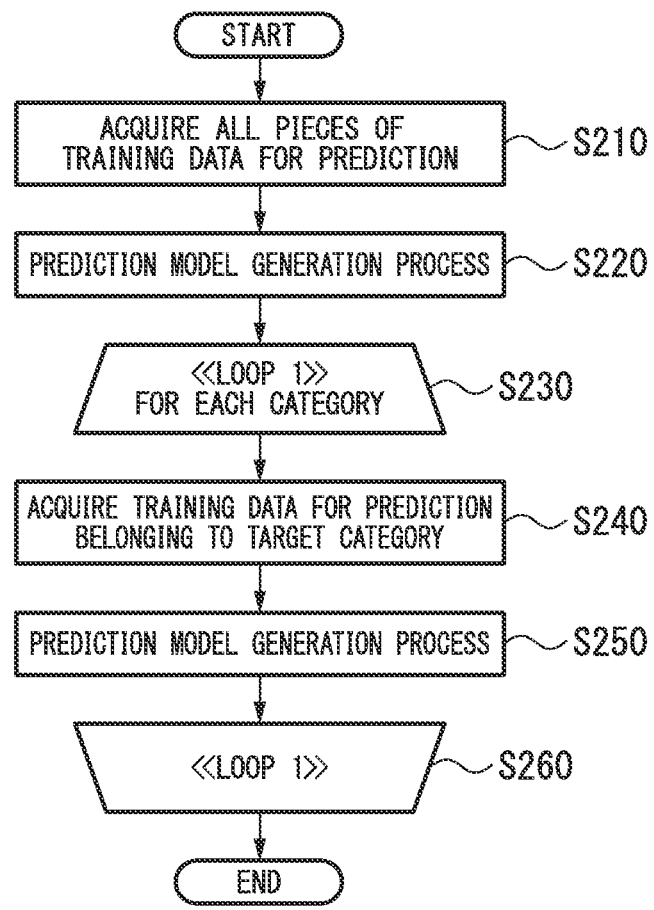
FIG. 8 is a flowchart showing the operation in the prediction model generation process of the prediction model generation unit according to the embodiment.

FIG. 8 is a flowchart showing the operation in the prediction model generation process of the prediction model generation unit 34.

First, the training data acquisition section 40 reads all pieces of training data for prediction and training data for correct answer acquisition subsequent to the training data for prediction from the storage unit 31, and inputs them to the first feature amount extraction section 41 (step S210). The prediction model generation unit 34 performs a prediction model learning process shown in FIG. 9, which will be described later, and sets the prediction model generated by the learning to a no-cluster prediction model (step S220).

Then, the training data acquisition section 40 selects one cluster that has not yet been selected (step S230). The training data acquisition section 40 reads all pieces of training data for prediction belonging to the selected cluster and training data for correct answer acquisition corresponding to the training data for prediction from the storage unit 31, and inputs them to the first feature amount extraction section 41 (step S240). The prediction model generation unit 34 performs the prediction model learning process shown in FIG. 9, which will be described later, and sets the prediction model generated by the learning to the cluster-specific prediction model of the cluster selected in step S230 (step S250). When there is a cluster that has not yet been selected (step S260), the prediction model generation unit 34 returns to the process of step S230. The training data acquisition section 40 selects one cluster that has not yet been selected (step S230), and the prediction model generation unit 34 performs the process of steps S240 and S250. Then, when all clusters have been selected, the prediction model generation unit 34 ends the process (step S260).

Figure 9:
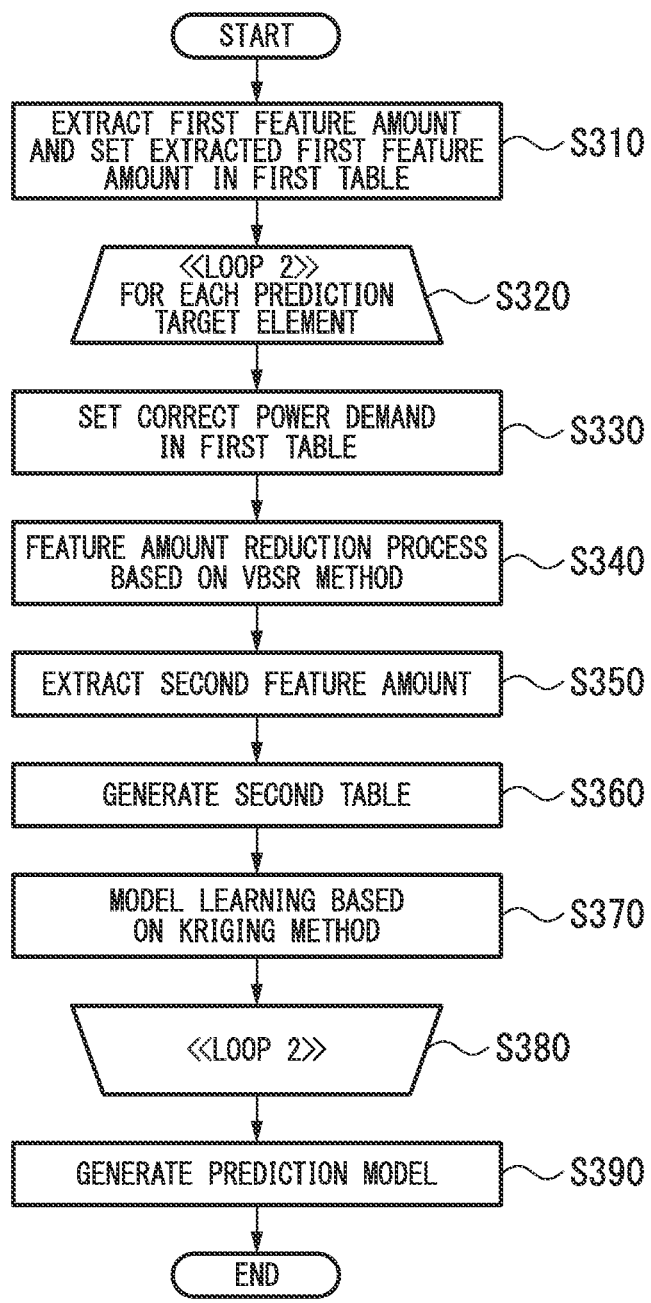
FIG. 9 is a flowchart showing the operation in the prediction model learning process of the prediction model generation unit according to the embodiment.

FIG. 9 is a flowchart showing the operation in the prediction model learning process of the prediction model generation unit 34.

The first feature amount extraction section 41 extracts a feature amount from the input training data for prediction. The first feature amount extraction section 41 writes the training data for prediction and the first feature amount table, in which the feature amount extracted from the training data for prediction is set, in the storage unit 31 (step S310).

The first feature amount extraction section 41 selects one of non-selected elements of the elements, which are included in 2 days of the prediction target period, as a prediction target (step S320). The first feature amount extraction section 41 acquires the power demand corresponding to the element of the prediction target from the training data for correct answer acquisition subsequent to the training data for prediction, writes the acquired power demand in the first feature amount table, and stores the first feature amount table in the storage unit 31 (step S330).

Then, the second feature amount extraction section 42 removes the feature amount, which does not contribute to the estimation of the element of the prediction target, from the first feature amount read from the first feature amount table of the storage unit 31 using a method in which the ARD is used for model learning, such as a VBSR method (step S340). Then, the second feature amount extraction section 42 extracts the feature amount, which remains without being removed from the first feature amount, as a second feature amount (step S350), and generates a second feature amount table and writes and stores the second feature amount table in the storage unit 31 (step S360).

Then, the prediction model generation section 43 reads the second feature amount from the second feature amount table of the storage unit 31. Then, the prediction model generation section 43 performs model learning using the Kriging method that uses the feature amount included in the read second feature amount and Expression (13) (step S360), and generates an approximation model that is a Kriging prediction expression (step S370).

When there is an element that has not yet been selected as a prediction target, the prediction model generation section 43 returns to step S320, selects the element that has not yet been selected and sets the element as a prediction target, and repeats the process from step S330 (step S380). When all the elements included in 2 days of the prediction target period have been selected, the prediction model generation section 43 sets a set of approximation models generated for each element as a prediction model (step S390). When the cluster generation process is performed from step S220, the generated prediction model becomes a no-cluster prediction model. When the cluster generation process is performed from step S250, the generated prediction model becomes a cluster-specific prediction model.

As described above, the feature amount that does not contribute to the prediction of the power demand is removed in advance by model learning using the ARD, and the final approximation model is generated by performing the Kriging method using only the feature amount that contributes to the estimation of the power demand. Therefore, compared with the related art in which the approximation model is generated using only the Kriging method, it is possible to generate an approximation model in a shorter time.

In addition, when generating an approximation model using only the Kriging method, the feature amount as noise that does not contribute to the estimation of the power demand is also reflected in the approximation model.

On the other hand, according to the present embodiment, after removing the feature amount as noise by the reduction process, the second feature amount that contributes to the estimation of the power demand is extracted, and the approximation model is learned using the second feature amount according to the Kriging method, thereby generating the prediction model. Therefore, it is possible to generate the prediction model with higher accuracy compared with the related art.

[Detailed Operation of the Evaluation Unit 35]

Figure 10:
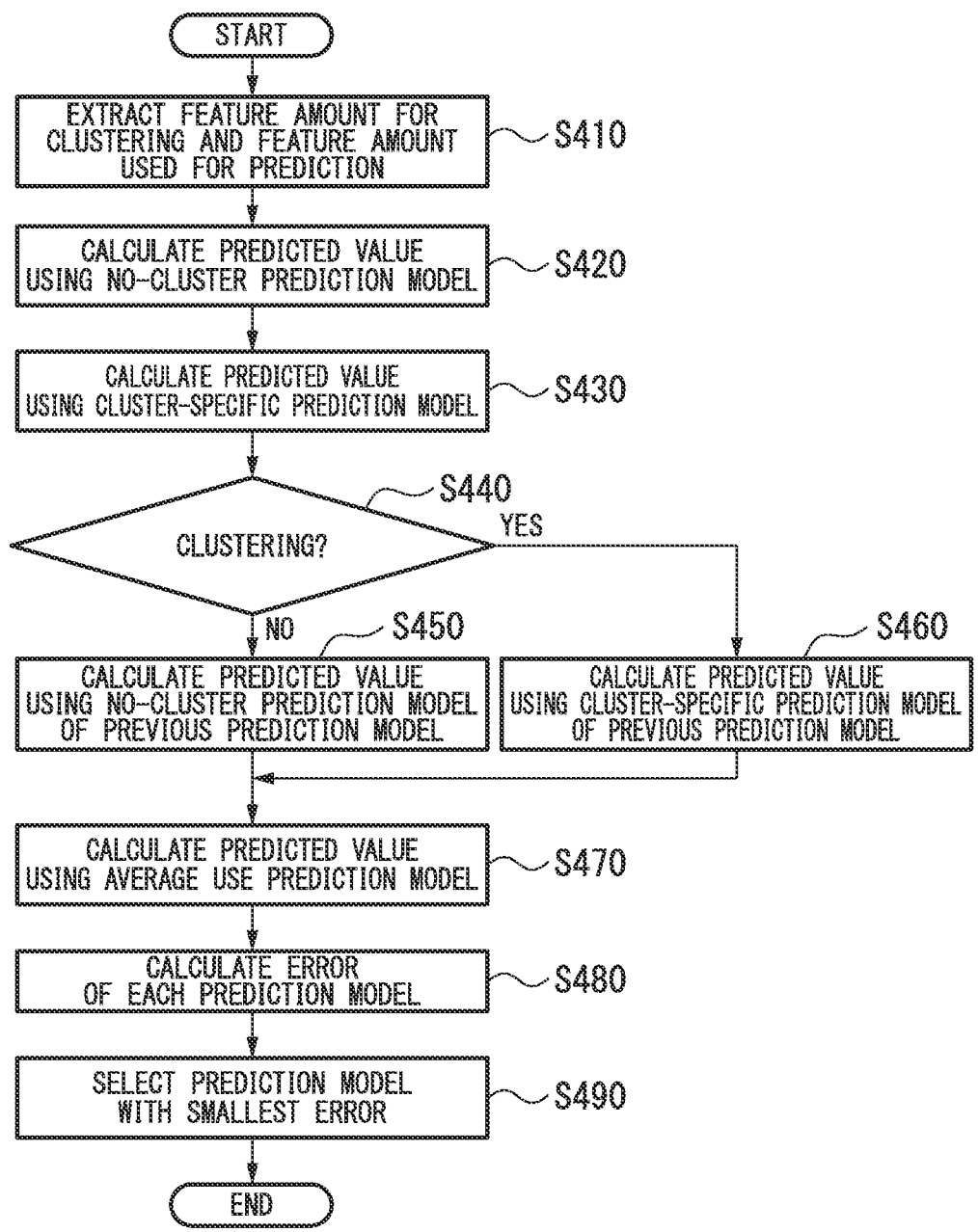
FIG. 10 is a flowchart showing the operation in the prediction model selection process of an evaluation unit according to the embodiment.

FIG. 10 is a flowchart showing the operation in the prediction model selection process of the evaluation unit 35, and shows the detailed process of step S150 in FIG. 4.

First, the evaluation unit 35 extracts a feature amount for clustering and a feature amount, which is used as an input parameter of the prediction model, from test data for evaluation (step S410). The evaluation unit 35 calculates a prediction result of the time-series data of the prediction target period of 2 days based on the cluster-specific prediction model using the extracted feature amount of the test data for evaluation as an input parameter in the no-cluster prediction model generated in step S140 (step S420). That is, the evaluation unit 35 calculates a predicted value by using the feature amount extracted from the test data for evaluation (time-series data $X_{n-7}$, $X_{n-6}$, and $X_{n-5}$) as an input parameter in the approximation model of each element of the prediction target period of 2 days that configures a no-cluster prediction model, and obtains prediction results $X_{n-4}'$ and $X_{n-3}'$ of the time-series data of the prediction target period of 2 days that is the calculated predicted value of each element.

Then, after calculating the probability that the test data for evaluation belongs to each cluster based on the feature amount for clustering, the evaluation unit 35 combines the cluster-specific prediction models generated for respective clusters using the calculated probability, and calculates a prediction result based on the combined cluster-specific prediction model using the test data for evaluation. That is, the evaluation unit 35 calculates a predicted value of each element of the prediction target period of 2 days based on the cluster-specific prediction model using the feature amount of the test data for evaluation as an input parameter for each cluster, and obtains a prediction result of the time-series data of the prediction target period of 2 days that is the calculated predicted value of each element. The evaluation unit 35 multiplies the prediction result of the time-series data of the prediction target period of 2 days obtained for each cluster by a cluster proximity index that is the probability of belonging to the cluster, and calculates a sum of the multiplication result between the cluster proximity index and the predicted value obtained for each cluster as the prediction results $X_{n-4}'$ and $X_{n-3}'$ of the time-series data of the prediction target period of 2 days (step S430).

The evaluation unit 35 reads a previous prediction model and a clustering flag from the storage unit 31. When the clustering flag is OFF (step S440: NO), the evaluation unit 35 determines that the previous prediction model is a no-cluster prediction model. Similar to step S420, the evaluation unit 35 calculates the prediction results $X_{n-4}'$ and $X_{n-3}'$ of the time-series data of the prediction target period of 2 days based on the previous prediction model using the extracted feature amount as an input parameter (step S450).

On the other hand, when the clustering flag is ON (step S440: YES), the evaluation unit 35 determines that the previous prediction model is a cluster-specific prediction model. Similar to step S430, the prediction unit 36 calculates the prediction results $X_{n-4}'$ and $X_{n-3}'$ of the time-series data of the prediction target period of 2 days using the previous prediction model (step S460).

After the process of step S450 or S460, the evaluation unit 35 calculates a prediction result based on the average use prediction model using the test data for evaluation. Specifically, the evaluation unit 35 sets the average of the test data for evaluation (time-series data $X_{n-7}$, $X_{n-6}$, and $X_{n-5}$) of the prediction use period of 3 days as a prediction result $X_{n-4}'$ of the first day, and calculates an average of the prediction result $X_{n-4}'$ of the first day and the test data for evaluation (time-series data $X_{n-6}$ and $X_{n-5}$) of the newest two days as a prediction result $X_{n-3}'$ of the second day of the prediction target period (step S470).

The evaluation unit 35 collates the prediction results $X_{n-4}'$ and $X_{n-3}'$ calculated by each prediction model with the test data for correct verification (time-series data $X_{n-4}$ and $X_{n-3}$) (step S480), and selects a prediction model with the smallest error (step S490). For error calculation, for example, Akaike information criterion (AIC: index for evaluating the goodness of the statistical model) can be used. Specifically, a maximum log likelihood $ll(\hat{\sigma}^2, \hat{a}, \hat{b}, \hat{c}, \ldots | x, y)$ is obtained by calculating the maximum likelihood estimator of the variance from the residual sum of squares of the correct answer and prediction using the following Expression (15), and calculates AIC by using the maximum log likelihood calculated from Expression (15) for lnL in Expression (16).

The smaller the value of the calculated AIC, the smaller the error. In addition, x and y are elements of test data for correct verification $X_{n-4}$ and $X_{n-3}$ and elements of the prediction results $X_{n-4}'$ and $X_{n-3}'$, $\hat{a}$, $\hat{b}$, $\hat{c}$, ... are estimated coefficients of a polynomial model for calculating y from x, n is the number of pieces of data of a model, $\hat{\sigma}^2$ is an estimated deviation, and k is the number of parameters in a model.

[Expression 15]

$$ll(\hat{\sigma}^2, \hat{a}, \hat{b}, \hat{c}, \ldots | x, y) = -\frac{n}{2}(\log(2\pi) + \log\hat{\sigma}^2 + 1) \quad (15)$$

[Expression 16]

$$AIC = -2\ln L + 2k \quad (16)$$

The evaluation unit 35 updates the storage content of the storage unit 31 based on the selection. When a no-cluster prediction model is selected, the evaluation unit 35 writes the no-cluster prediction model in the storage unit 31, and sets the prediction model rewrite flag to ON and sets the clustering flag and the average flag to OFF. On the other hand, when a cluster-specific prediction model is selected, the evaluation unit 35 writes the cluster-specific prediction model in the storage unit 31, and sets the prediction model rewrite flag and the clustering flag to ON and sets the average flag to OFF. In addition, the evaluation unit 35 sets the rewrite flag and the average flag to OFF when a previous prediction model is selected, and sets the rewrite flag to OFF and sets the average flag to ON when an average use prediction model is selected. When writing the latest prediction model in the storage unit 31, the evaluation unit 35 writes the value of the weighting parameter of each approximation model that configures the prediction model.

The prediction unit 36 calculates a prediction result using the prediction data (time-series data $X_{n-2}$, $X_{n-1}$, and $X_n$) based on the prediction model selected by the evaluation unit 35 in step S490, and outputs the calculated prediction result.

Figure 11:
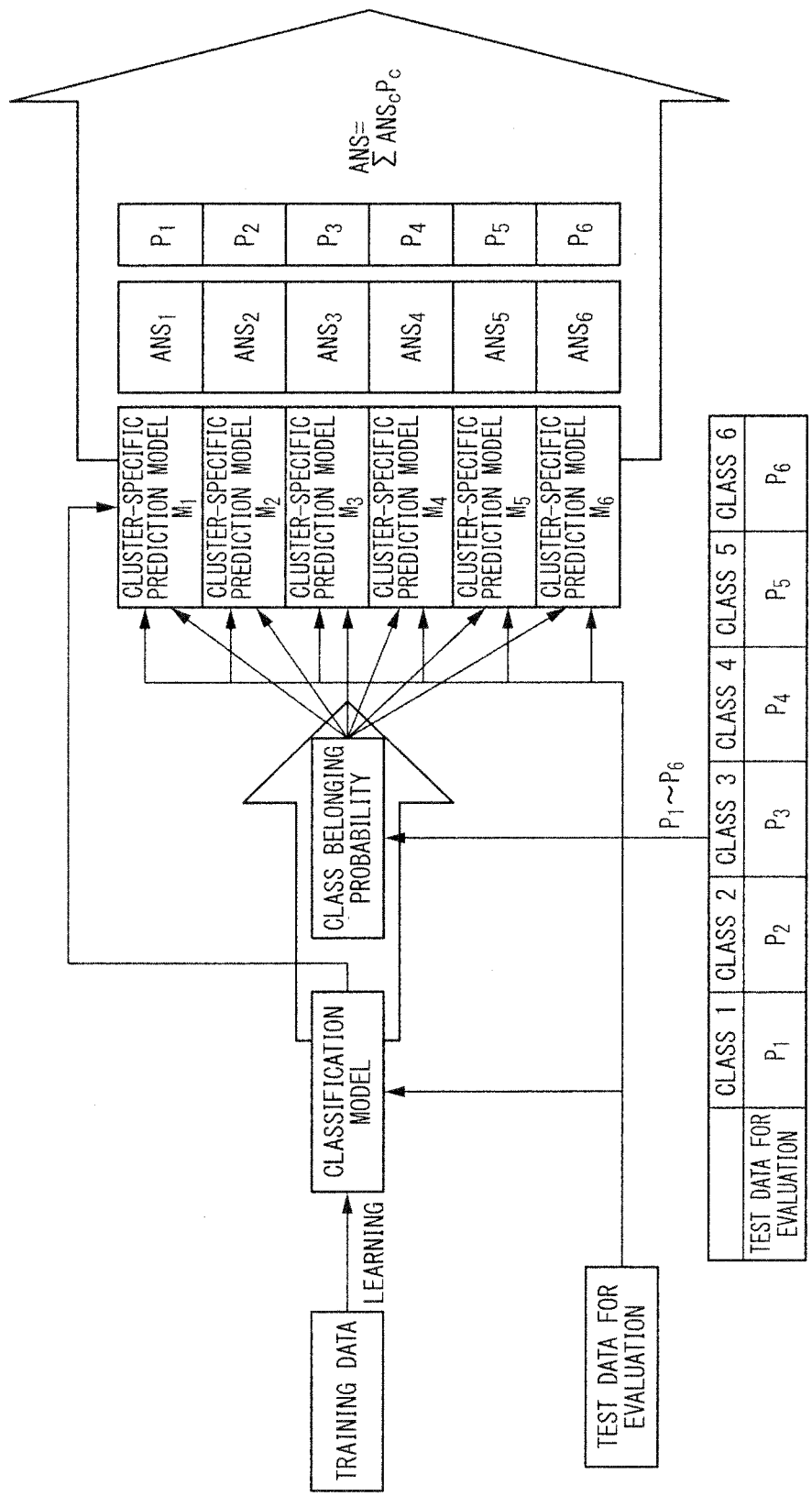
FIG. 11 is an explanatory view of the cluster-specific prediction model application process of an evaluation unit according to the embodiment.

FIG. 11 is an explanatory view of the cluster-specific prediction model application process.

As shown in FIG. 11, when generating a prediction result based on the cluster-specific prediction model, the evaluation unit 35 generates a classification model for calculating the cluster proximity index that is a probability that the test data for evaluation belongs to each class (hereinafter, referred to as a "class belonging probability"). A class is a number of the cluster. Assuming that the class belonging probability of a class c (c=1, 2, ..., C) is $P_c$ and the cluster of the class c is $S_c$, the class belonging probability $P_c$ of the class c indicates a probability that test data (test data for evaluation) belongs to the cluster $S_c$. Sparse Logistic Regression (SLR) using the probability derivation expression of logistic regression analysis is used for the generation of the classification model.

Using the generated classification model, the evaluation unit 35 calculates the class belonging probability $P_c$ (c=1, 2, ..., C) for the feature amount for clustering extracted from the test data for evaluation. The evaluation unit 35 calculates, as a prediction result, ANS obtained by weighting a solution $ANS_c$, which is calculated from the test data for evaluation using each cluster-specific prediction model $M_c$ classified in each cluster $S_c$, according to the class belonging probability $P_c$ corresponding to the cluster-specific prediction model $M_c$ used for the calculation of the solution $ANS_c$ and adding the results as shown in the following Expression (17).

[Expression 17]

$$ANS = \Sigma ANS_c P_c \quad (17)$$

Figure 12:
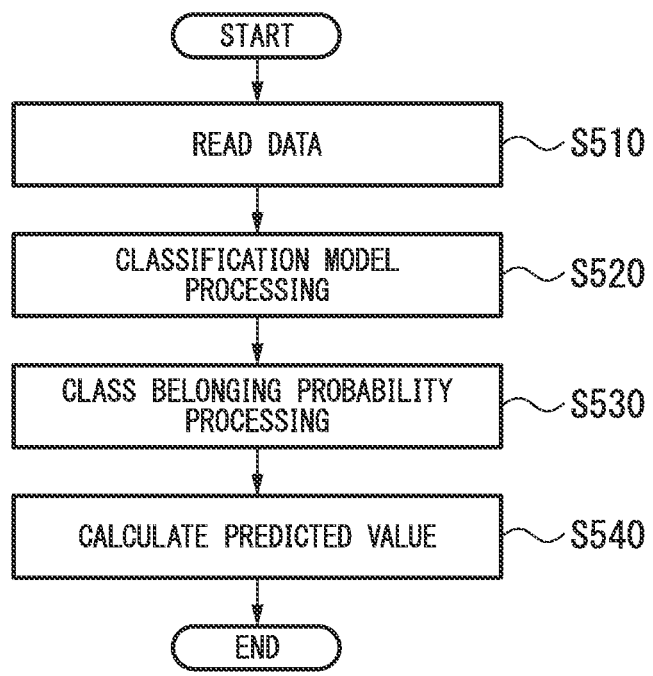
FIG. 12 is a flowchart showing the operation in the cluster-specific prediction model application process of the evaluation unit according to the embodiment.

FIG. 12 is a flowchart showing the operation in the cluster-specific prediction model application process of the evaluation unit 35, and shows the detailed process of step S430 in FIG. 10.

After reading the training data for prediction from the storage unit 31 (step S510), the evaluation unit 35 generates a classification model using the feature amount for clustering extracted from the read training data for prediction (step S520).

In logistic regression analysis, assuming that X is a vector of the dependent variable, $x_j$ is an explanatory variable, and θ is given as a weight, the class belonging probability P that is an object variable is obtained by Expression (19) by maximizing the following Expression (18). Here, $X=(x_1, x_2, \ldots, x_D)$, $\theta=(\theta, \theta_1, \theta_2, \ldots, \theta_D)$, $\theta_d$ is the weight of the feature amount for clustering $x_d$ (d=1, 2, ..., D), and D is the number of types of the feature amount for clustering. In addition, the suffixes (c) and (k) indicate a class. The probability $P(S_c|X)$ is a posterior probability that the cluster $S_c$ is obtained when X is given.

[Expression 18]

$$f_c(X; \theta^{(c)}) = \sum_{d=1}^{D} \theta_d^{(c)} x_d + \theta_0^{(c)} \quad c = 1, \ldots, C \qquad (18)$$

[Expression 19]

$$P = \frac{\exp(f_c(X; \theta^{(c)}))}{\sum_{k=1}^{C} \exp(f_k(X; \theta^{(c)}))} \equiv P(S_c | X) \quad c = 1, \ldots, C \qquad (19)$$

From the above, the relationship between the input x and the output y when there are N pieces of training data for prediction with a known determination result is expressed by the following Expression (20).

[Expression 20]

$$P(y_1, \ldots, y_N | X_1, \ldots, X_N; \theta) = \prod_{n=1}^{N} \prod_{c=1}^{C} P_n^{(c) y_n^{(c)}} \qquad (20)$$

The evaluation unit 35 determines the weight θ so as to maximize the above Expression (20) using the feature amount for clustering of the training data for prediction read from the storage unit 31. When the number of pieces of training data for prediction is N, the feature amount for clustering of the n-th (n=1, 2, ..., N) training data for prediction is set to a vector $X_n$ of the dependent variable, $y_n^{(c)}$ when the class is a correct answer is set to 1, and $y_n^{(c)}$ when the class is not a correct answer is set to 0. "Class is a correct answer" means that the cluster $S_c$ of the class c matches a cluster set in the training data for prediction. In addition, $P_n^{(c)}$ is calculated by the above Expression (19).

The evaluation unit 35 generates a derivation expression of the class belonging probability shown in the following Expression (21), that is, a classification model, using θ determined so as to maximize Expression (20). In addition, t indicates transposition, and $X_n$ is input data of the classification target.

[Expression 21]

$$P_n^{(c)} = P \frac{\exp(X_n^t \theta^{(c)})}{\sum_{k=1}^{C} \exp(X_n^t \theta^{(k)})} = P(S_c | X_n) \qquad (21)$$

Using Expression (21) that is the classification model generated in step S520, the evaluation unit 35 calculates class belonging probabilities $P_n^{(1)}$ to $P_n^{(c)}$ of the test data for evaluation with the feature amount for clustering acquired from the test data for evaluation as $X_n$ (step S530). The evaluation unit 35 calculates solutions $ANS_1$ to $ANS_C$ from the feature amount of the test data for evaluation acquired in step S510 using cluster-specific prediction models $M_1$ to $M_C$ generated in step S140 of FIG. 4. That is, the evaluation unit 35 calculates a predicted value by using the feature amount of the test data for evaluation (time-series data $X_{n-7}$, $X_{n-6}$, and $X_{n-5}$) as an input parameter in each approximation model of each element of the prediction target period, which configures a cluster-specific prediction model of the cluster $S_c$, for each cluster $S_c$ (c=1, 2, ..., C), and calculates $ANS_c$ that is the time-series data of the prediction target period that is the calculated predicted value of each element. The evaluation unit 35 calculates a predicted value by weighting the solution $ANS_c$ (c=1, 2, ..., C) with the class belonging probability $P_c$ obtained as the class belonging probabilities $P_n^{(1)}$ to $P_n^{(c)}$ and adding the results using the above Expression (17) (step S540).

When the cluster-specific prediction model is selected in step S490 of FIG. 10, the evaluation unit 35 writes the cluster-specific prediction model of each cluster in the storage unit 31 and writes the classification model of each cluster. Then, when calculating a predicted value with a cluster-specific prediction model that is a previous prediction model in step S460 of FIG. 10, the evaluation unit 35 reads the classification model from the storage unit 31 and performs the process from step S530 of FIG. 12.

In addition, the evaluation unit 35 may select a cluster-specific prediction model classified into the cluster of the class with the highest class belonging probability among the calculated class belonging probabilities and calculate a predicted value from the test data for evaluation using only the selected cluster-specific prediction model. For example, when the highest class belonging probability of the class belonging probabilities $P_n^{(1)}$ to $P_n^{(c)}$ calculated for the test data for evaluation is $P_n^{(1)}$, the evaluation unit 35 selects the cluster-specific prediction model $M_1$ classified into the cluster $S_1$ of the class 1 with the highest class belonging probability. The evaluation unit 35 calculates $ANS_1$ of each element from the test data for evaluation using the selected cluster-specific prediction model $M_1$, and sets it as a predicted value.

[Detailed Operation of the Prediction Unit 36]

In step S160 of FIG. 4, the prediction unit 36 extracts a feature amount, which is used as an input parameter of the prediction model, from the prediction data. When a no-cluster prediction model is selected by the evaluation unit 35, the prediction unit 36 calculates a prediction result of the time-series data of the prediction target period of 2 days based on the cluster-specific prediction model using the extracted feature amount of the prediction data as an input parameter in the no-cluster prediction model generated in step S140. That is, the prediction unit 36 calculates a predicted value by using the feature amount extracted from the prediction data (time-series data $X_{n-2}$, $X_{n-1}$, and $X_n$) as an input parameter in the approximation model of each element of the prediction target period of 2 days that configures a no-cluster prediction model, and calculates a prediction result of the time-series data of the prediction target period of 2 days that is the calculated predicted value of each element.

When a no-cluster prediction model is selected by the evaluation unit 35, the prediction unit 36 extracts a feature amount for clustering from the prediction data, and calculates a prediction result by the same process as in steps S530 and S540 of FIG. 12. Using Expression (21) that is the classification model generated by the evaluation unit 35 in step S520, the prediction unit 36 calculates the class belonging probabilities $P_n^{(1)}$ to $P_n^{(c)}$ of the prediction data with the feature amount for clustering acquired from the prediction data as $X_n$. The prediction unit 36 calculates a predicted value by using the feature amount of the prediction data as an input parameter in the approximation model of each element of the prediction target period of 2 days that configures the cluster-specific prediction models $M_1$ to $M_c$ generated in step S140 of FIG. 4, and calculates $ANS_c$ that is the time-series data of the prediction target period of 2 days that is the calculated predicted value of each element. The prediction unit 36 calculates a predicted value by weighting the solution $ANS_c$ (c=1, 2, . . . , C) with the class belonging probability $P_c$ of the prediction data and adding the results using Expression (17).

When a no-cluster prediction model that is a previous prediction model is selected by the evaluation unit 35, the prediction unit 36 reads the previous prediction model from the storage unit 31, and calculates a predicted value by using the feature amount extracted from the prediction data as an input parameter in the approximation model of each element of the prediction target period of 2 days that configures the read prediction model. The prediction unit 36 calculates a prediction result of the time-series data of the prediction target period of 2 days that is the calculated predicted value of each element.

When a cluster-specific prediction model that is a previous prediction model is selected by the evaluation unit 35, the prediction unit 36 reads the previous prediction model and the classification model from the storage unit 31. The prediction unit 36 calculates a predicted value by the same process as in steps S530 and S540 of FIG. 12. That is, using Expression (21) that is the read classification model, the prediction unit 36 calculates the class belonging probabilities $P_n^{(1)}$ to $P_n^{(c)}$ of the prediction data with the feature amount for clustering acquired from the prediction data as X. The prediction unit 36 calculates a predicted value by using the feature amount of the prediction data as an input parameter in the approximation model of each element of the prediction target period of 2 days that configures the cluster-specific prediction models $M_1$ to $M_c$ that are the read previous prediction models, and calculates $ANS_c$ that is the time-series data of the prediction target period of 2 days that is the calculated predicted value of each element. The prediction unit 36 calculates a predicted value by weighting the solution $ANS_c$ (c=1, 2, . . . , C) with the class belonging probability $P_c$ of the prediction data and adding the results using the above Expression (17).

When an average use prediction model is selected by the evaluation unit 35, the prediction unit 36 sets the average of the prediction data (time-series data $X_{n-2}$, $X_{n-1}$, and $X_n$) as a prediction result of the first day, and calculates an average of the prediction result of the first day and prediction data (time-series data $X_{n-1}$ and $X_n$) of the newest two days as a prediction result of the second day.

[Effects]

According to the embodiment described above, the time-series data prediction device categorizes the time-series data of the energy demand when the energy use conditions are similar, generates a prediction model in each category (cluster), and obtains a predicted value of the future energy demand from the change in the past energy demand using the generated prediction model.

When generating a prediction model using the time-series data of the past energy demand as training data, it is not possible to generate an accurate prediction model unless time-series data of the energy use conditions similar to the prediction target is included in the training data. For this reason, the time-series data prediction device uses a prediction model determined to have high accuracy in the past or includes time-series data, which is determined to be similar to the prediction target, in training data, so that the more accurate prediction model can be used.

Therefore, the time-series data prediction device can predict the power demand with high accuracy not only when days of the same power use conditions continue but also when there is a sudden power demand change or a change in the power use pattern, such as when days of significantly different power use conditions continue.

[Others]

The time-series data prediction device 3 described above includes a computer system.

In addition, the process of the operation of the time-series data prediction device 3 is stored in a computer-readable recording medium in the form of a program, and the processing described above is performed by reading and executing the program using a computer system. The 'computer system' referred to herein includes a CPU, various memories or an OS, and hardware, such as peripheral devices.

In addition, the "computer system" may also include a homepage presenting environment (or display environment) if a WWW system is used.

Examples of the "computer-readable recording medium" include portable media, such as a flexible disk, a magneto-optical disc, a ROM, and a CD-ROM, and a storage device, such as a hard disk built into a computer system. In addition, examples of the "computer-readable recording medium" include a recording medium that stores a program dynamically for a short period of time like a network, such as the Internet, or a communication line when a program is transmitted through a communication line, such as a telephone line, and may include a recording medium that stores a program for a predetermined period of time like a volatile memory in a computer system which serves as a server or a client in this case. In addition, the above program may be a program for realizing some of the functions described above or may be a program capable of realizing the above functions by combination with a program already recorded in the computer system.

In addition, the technical scope of the present invention is not limited to the embodiment described above, and those obtained by modifying the above-described embodiment in various ways without departing from the spirit and scope of the present invention are also included. That is, the configuration of the embodiment described above is just an example, and can be appropriately changed.

What is claimed is:

1. A time-series data prediction device, including a computer processing unit, for predicting power demand by calculating a predicted value of an observation value based on time-series data of an observation value, comprising:

an acquisition unit that acquires a plurality of observation values from an energy demand notification device that continue at predetermined time intervals, as a prediction data, from time-series data of an observation value of a predetermined observation target and that acquires the plurality of observation values that continue at the predetermined time intervals, as a test data, from the time-series data excluding the prediction data and that acquires a training data from the time-series data excluding the prediction data and the test data, wherein the energy demand notification device acquires the plurality of observation values of energy demand from a sensor attached to a power distribution board;

a prediction model generation unit that generates a prediction model to calculate time-series data, which is an observation value predicted based on the given time-series data, using the training data;

a prediction unit that calculates a predicted value of an observation value using the prediction model generated by the prediction model generation unit and the prediction data acquired by the acquisition unit;

a storage unit that stores a prediction model used in the past; and an evaluation unit that evaluates a prediction accuracy of the prediction model generated by the prediction model generation unit using the test data, wherein:

the evaluation unit compares at least a predicted value calculated by the prediction model acquired from the storage unit, a predicted value calculated by the prediction model generated by the prediction model generation unit, and a predicted value calculated by an average use prediction model to acquire a predicted value based on an average of time-series data of a predetermined period, using the test data, the evaluation unit sets a clustering flag and an average flag to off and a prediction model rewrite flag to on when a no-cluster prediction model is selected, the prediction model rewrite flag and the clustering flag to on and the average flag to off when a cluster-specific prediction model is selected, the prediction model rewrite flag, the average flag, and the clustering flag to off when a previous prediction model is selected, and the average flag to on when an average use prediction model is selected, and the prediction unit calculates a predicted value of an observation value using a prediction model having a best result of the comparison of the evaluation unit and the prediction data acquired by the acquisition unit.

2. The time-series data prediction device of an observation value according to claim 1, wherein the acquisition unit searches for time-series data whose correlation with the prediction data is higher than a predetermined value from the time-series data, and includes the time-series data obtained by a search in the training data.

3. The time-series data prediction device of an observation value according to claim 1, wherein, when the average use prediction model is used in a previous prediction, the acquisition unit includes time-series data used as a prediction data in the previous prediction in the training data.

4. The time-series data prediction device of an observation value according to claim 1, further comprising:

a deviation amount detection unit that detects a record deviation amount that is a difference between an observation value and the predicted value calculated by the prediction unit using the prediction data, wherein, when the record deviation amount is smaller than a predetermined value and the prediction model generated by the prediction model generation unit is used to calculate the predicted value, the prediction unit calculates a predicted value of an observation value with the average use prediction model when a difference between the observation value and a predicted value calculated by the average use prediction model using the prediction data used to calculate the predicted value is equal to or less than a predetermined value.

5. The time-series data prediction device of an observation value according to claim 1, further comprising:

a deviation amount detection unit that detects a record deviation amount that is a difference between an observation value and the predicted value calculated by the prediction unit, wherein, when the record deviation amount detected by the deviation amount detection unit is larger than a predetermined value, the acquisition unit reselects the training data from the time-series data, and the prediction model generation unit generates a prediction model using the training data reselected by the acquisition unit.

6. A time-series data prediction method of an observation value executed by a time-series data prediction device, including a computer processing unit, for predicting power demand by calculating a predicted value of an observation value based on time-series data of the observation value, the method comprising:

performing an acquisition process in which an acquisition unit acquires a plurality of observation values from an energy demand notification device that continue at predetermined time intervals, as a prediction data, from time-series data of an observation value of a predetermined observation target and acquires the plurality of observation values that continue at the predetermined time intervals, as a test data, from the time-series data excluding the prediction data and acquires a training data from the time-series data excluding the prediction data and the test data, wherein the energy demand notification device acquires the plurality of observation values of energy demand from a sensor attached to a power distribution board;

performing a prediction model generation process in which a prediction model generation unit generates a prediction model to calculate time-series data, which is an observation value predicted based on the given time-series data, using the training data;

performing a prediction process in which a prediction unit calculates a predicted value of an observation value using the prediction model generated in the prediction model generation process and the prediction data acquired in the acquisition process;

performing a storage process in which a storage unit stores a prediction model used in the past; and performing an evaluation process in which an evaluation unit evaluates a prediction accuracy of the prediction model generated by the prediction model generation process using the test data, wherein:

the evaluation process compares at least a predicted value calculated by the prediction model acquired from the storage process, a predicted value calculated by the prediction model generated by the prediction model generation process, and a predicted value calculated by an average use prediction model to acquire a predicted value based on an average of time-series data of a predetermined period, using the test data, the evaluation process sets a clustering flag and an average flag to off and a prediction model rewrite flag to on when a no-cluster prediction model is selected, the prediction model rewrite flag and the clustering flag to on and the average flag to off when a cluster-specific prediction model is selected, the prediction model rewrite flag, the average flag, and the clustering flag to off when a previous prediction model is selected, and the average flag to on when an average use prediction model is selected, and the prediction process calculates a predicted value of an observation value using a prediction model having a best result of the comparison of the evaluation process and the prediction data acquired by the acquisition process.

7. A program causing a computer, which is used as a time-series data prediction device, including a computer processing unit, for predicting power demand by calculating a predicted value of an observation value based on time-series data of the observation value, to function as:

an acquisition unit that acquires a plurality of observation values from an energy demand notification device that continue at predetermined time intervals, as a prediction data, from time-series data of an observation value of a predetermined observation target and that acquires the plurality of observation values that continue at the predetermined time intervals, as a test data, from the time-series data excluding the prediction data and that acquires a training data from the time-series data excluding the prediction data and the test data, wherein the energy demand notification device acquires the plurality of observation values of energy demand from a sensor attached to a power distribution board;

a prediction model generation unit that generates a prediction model to calculate time-series data, which is an observation value predicted based on the given time-series data, using the training data;

a prediction unit that calculates a predicted value of an observation value using the prediction model generated by the prediction model generation unit and the prediction data acquired by the acquisition unit;

a storage unit that stores a prediction model used in the past; and an evaluation unit that evaluates a prediction accuracy of the prediction model generated by the prediction model generation unit using the test data, wherein:

the evaluation unit compares at least a predicted value calculated by the prediction model acquired from the storage unit, a predicted value calculated by the prediction model generated by the prediction model generation unit, and a predicted value calculated by an average use prediction model to acquire a predicted value based on an average of time-series data of a predetermined period, using the test data, the evaluation unit sets a clustering flag and an average flag to off and a prediction model rewrite flag to on when a no-cluster prediction model is selected, the prediction model rewrite flag and the clustering flag to on and the average flag to off when a cluster-specific prediction model is selected, the prediction model rewrite flag, the average flag, and the clustering flag to off when a previous prediction model is selected, and the average flag to on when an average use prediction model is selected, and the prediction unit calculates a predicted value of an observation value using a prediction model having a best result of the comparison of the evaluation unit and the prediction data acquired by the acquisition unit.

* * * * *